United States Patent
Haug (10) Patent No.: US 10,700,727 B2
(45) Date of Patent: Jun. 30, 2020

(54) PROTECTIVE/CONTROL RECEPTACLE

(71) Applicant: Thomas Haug, Birkenfeld (DE)

(72) Inventor: Thomas Haug, Birkenfeld (DE)

( * ) Notice: Subject to any disclaimer, the term of this patent is extended or adjusted under 35 U.S.C. 154(b) by 0 days.

(21) Appl. No.: 16/075,008

(22) PCT Filed: Feb. 21, 2017

(86) PCT No.: PCT/EP2017/053881
§ 371 (c)(1),
(2) Date: Aug. 2, 2018

(87) PCT Pub. No.: WO2017/148740
PCT Pub. Date: Sep. 8, 2017

(65) Prior Publication Data
US 2019/0007084 A1    Jan. 3, 2019

(30) Foreign Application Priority Data

Mar. 2, 2016    (DE) .................... 20 2016 101 134 U (51) Int. Cl.
*H04M 1/00* (2006.01)
*H04B 1/3888* (2015.01)
*G06F 1/16* (2006.01)
*H01H 9/02* (2006.01)
*A45C 11/00* (2006.01)
(Continued)

(52) U.S. Cl.
CPC ............ *H04B 1/3888* (2013.01); *A45C 11/00* (2013.01); *G06F 1/1626* (2013.01); *G06F 1/1628* (2013.01); *H01H 9/0242* (2013.01); *H01H 9/04* (2013.01); *A45C 2011/002* (2013.01); *A45C 2011/003* (2013.01); *G06F 2200/1633* (2013.01); *H01H 2009/0292* (2013.01);
(Continued)

(58) Field of Classification Search
CPC .......... H04B 1/3888; H04B 2001/3894; A45C 11/00; A45C 2011/002; A45C 2011/003; H01H 9/0242; H01H 9/04; H01H 2009/0292; G06F 1/1626; A06F 1/1628; A06F 2200/1633
USPC .................... 455/575.8, 575.1, 418; 345/173
See application file for complete search history.

(56) References Cited

U.S. PATENT DOCUMENTS 5,092,459 A    3/1992    Uljanic et al.
6,068,119 A    5/2000    Derr et al.
(Continued)

FOREIGN PATENT DOCUMENTS

WO    WO 92/07372 A1    4/1992
WO    WO 00/51315 A1    8/2000

OTHER PUBLICATIONS

International Search Report (PCT/ISA/210) issued in PCT/EP2017/053881, dated May 8, 2017.

*Primary Examiner* — Danh C Le
(74) *Attorney, Agent, or Firm* — Birch, Stewart, Kolasch & Birch, LLP (57) ABSTRACT

A remote control arrangement has a protective/control receptacle and a mobile radio device for use as a remote control. The protective/control receptacle forms a closed peripheral cover on which a corner protector for holding corners of the mobile radio device is provided and has a receptacle-side control for controlling a device-side control on the mobile radio device. The receptacle-side control is operable from the outside. The receptacle-side control is haptically perceivable on the outer face of the cover and is used to control a virtual device-side control.

17 Claims, 7 Drawing Sheets

(51) Int. Cl.
   *H01H 9/04*      (2006.01)
   *H04M 1/18*      (2006.01)
   *H04M 1/725*     (2006.01)
   *H04B 1/38*      (2015.01)

(52) U.S. Cl.
   CPC ..... *H04B 2001/3894* (2013.01); *H04M 1/185* (2013.01); *H04M 1/72533* (2013.01)

(56) References Cited

U.S. PATENT DOCUMENTS

| | | | |
|---|---|---|---|
| 9,528,935 B2* | 12/2016 | Pulyassary | G01N 21/59 |
| 2001/0051508 A1* | 12/2001 | Wang | G02B 25/002 |
| | | | 455/575.1 |
| 2003/0184958 A1 | 10/2003 | Kao | |
| 2005/0253808 A1* | 11/2005 | Yoshida | G06F 3/0202 |
| | | | 345/156 |
| 2007/0247793 A1* | 10/2007 | Carnevali | G06F 1/1626 |
| | | | 361/679.1 |
| 2009/0140057 A1* | 6/2009 | Leen | G05D 23/1905 |
| | | | 236/49.3 |
| 2010/0035665 A1* | 2/2010 | Munson | G06F 1/1624 |
| | | | 455/575.1 |
| 2010/0245265 A1* | 9/2010 | Sato | G06F 1/1626 |
| | | | 345/173 |
| 2010/0315348 A1 | 12/2010 | Jellicoe et al. | |
| 2011/0187660 A1* | 8/2011 | Hirata | G06F 3/03547 |
| | | | 345/173 |
| 2012/0050165 A1 | 3/2012 | Kim et al. | |
| 2013/0082938 A1* | 4/2013 | Huang | G06F 3/0488 |
| | | | 345/173 |
| 2013/0120835 A1* | 5/2013 | Aoki | G03B 21/60 |
| | | | 359/449 |
| 2013/0187878 A1* | 7/2013 | Muikaichi | G06F 3/041 |
| | | | 345/173 |
| 2013/0321321 A1* | 12/2013 | Hiraoka | G06F 3/016 |
| | | | 345/173 |
| 2014/0062340 A1* | 3/2014 | Elgayyar | H03K 17/941 |
| | | | 315/360 |
| 2014/0066144 A1 | 3/2014 | Hong | |
| 2014/0214319 A1* | 7/2014 | Vucetic | G01C 21/3685 |
| | | | 701/533 |
| 2014/0218630 A1* | 8/2014 | Kang | G06F 3/044 |
| | | | 349/12 |
| 2014/0268628 A1* | 9/2014 | Mann | G08C 17/00 |
| | | | 362/23.1 |
| 2015/0182196 A1* | 7/2015 | Ninomiya | A61B 8/4427 |
| | | | 600/437 |
| 2015/0190114 A1* | 7/2015 | Ninomiya | A61B 8/4427 |
| | | | 600/437 |
| 2015/0212589 A1* | 7/2015 | Hatanaka | G06F 3/0414 |
| | | | 345/173 |
| 2015/0234189 A1* | 8/2015 | Lyons | G02B 27/028 |
| | | | 345/174 |
| 2015/0323961 A1* | 11/2015 | Leonhard | G06F 1/1637 |
| | | | 428/38 |
| 2016/0011660 A1* | 1/2016 | Wieder | G06F 3/04815 |
| | | | 345/158 |
| 2016/0209876 A1* | 7/2016 | Park | G06F 1/1652 |
| 2016/0378322 A1* | 12/2016 | Klicpera | G06F 3/04847 |
| | | | 715/773 |
| 2017/0013101 A1* | 1/2017 | Chen | H04M 1/18 |
| 2017/0060240 A1* | 3/2017 | Iino | G06F 3/016 |
| 2017/0061395 A1* | 3/2017 | Park | G06F 1/1626 |
| 2017/0235390 A1* | 8/2017 | Dong | G06F 3/044 |
| | | | 345/173 |
| 2017/0255272 A1* | 9/2017 | Flagg | G06F 3/017 |
| 2017/0287323 A1* | 10/2017 | Einaudi | G01R 31/3648 |
| 2018/0242704 A1* | 8/2018 | Richardson | A45C 11/00 |
| 2018/0352925 A1* | 12/2018 | Hemesath | A45C 11/00 |
| 2019/0109932 A1* | 4/2019 | Higgins | H04W 4/02 |
| 2019/0138200 A1* | 5/2019 | Zhang | G06F 3/0488 |
| 2019/0171170 A1* | 6/2019 | Becea | G05B 19/042 |
| 2020/0044670 A1* | 2/2020 | Beck | H04B 1/0039 |

\* cited by examiner

PROTECTIVE/CONTROL RECEPTACLE

The invention relates to a remote control arrangement having a protective/control receptacle for a mobile radio device that can be used as a remote control, such as a radio remote control or a computer device with a transceiver and antenna for controlling lifting equipment in industrial plants or on construction sites, according to the preamble of claim 1. This protective/control receptacle has a cover which defines a receptacle for the mobile radio device. Receptacle-side control means are provided on the cover for controlling the mechanical and/or virtual device-side control means of the mobile radio device. These device-side control means can be formed, for example, by at least one physical key and/or by control panels generated on a touchscreen or touchpad. The receptacle-side control means are configured in such a way that they can be acted upon or actuated from the exterior of the cover. The protective/control receptacle has a corner protector on the cover for holding the corners of the mobile radio device. By means of such a corner protector, the protective/control receptacle protects the mobile radio device held therein particularly effectively in the event of it being dropped, set on its edge, or also from pressure or impacts on the corners of the mobile radio device. This makes the protective/control receptacle according to the invention suitable for a particularly wide range of applications, such as in particular on construction sites or in industrial plants.

US 2014/0066144 A1 shows a waterproof housing for holding a mobile telephone, in which one side wall is pivotably mounted in order to be able to open and close the housing. Buttons of a flexible material are provided in a frame of the housing, by means of which the corresponding buttons of the mobile telephone can be actuated.

WO 92/07372 describes a protective receptacle for remote controls. The protective device has a plurality of nub-shaped shock absorbers and elastically deformable areas by means of which the protective receptacle can be fitted onto devices of different sizes.

US 2003/0184958 A1 shows a box-like receptacle for a tablet PC, which has a recess via which the tablet PC can be actuated even when held in the receptacle. A transparent material can be provided on the recess, by which the display of the tablet PC can be operated.

U.S. Pat. No. 5,092,459 describes a transparent protective receptacle for remote controls with push buttons. The protective receptacle can be opened and closed with a hook-and-loop fastener closure and has flexible raised areas by which the push buttons can be actuated.

A protective/control receptacle for a mobile electronic device with a touchscreen is known from US 2012/0050165 A1. This is used for subsequently attaching a keyboard to the touchscreen. The protective/control receptacle forms a loop-shaped cover which is pushed onto the electronic device.

The disadvantage of the known cover is that it only offers very limited protection for the mobile radio device concerned. Particularly in applications on construction sites or in industrial plants, where mechanical impacts due to the mobile radio device being set on its edge or falling or external effects caused by liquids or solids can frequently occur, there is a need to ensure adequate protection of the mobile radio device held in the protective/control receptacle.

The object of the invention is therefore to avoid the aforementioned disadvantages and to provide a remote control arrangement that offers not only convenient operation but also adequate protection for the mobile radio device.

This object is achieved by a remote control arrangement having the features of claim 1. The receptacle-side control means are configured differently from neighbouring regions of the exterior so that they can be haptically perceived or felt. The receptacle-side control means are used to at least partially control virtual device-side control means. As a result, the protective/control receptacle of the remote control arrangement enables exact control of a mobile radio device held therein via the precisely perceivable receptacle-side control means.

Furthermore, it is favourable if the receptacle-side control means have at least one material recess in the cover. The material recess can, for example, be recessed so deeply into the cover that the latter remains closed, yet enables a voltage change on a touchscreen arranged in the device receptacle when a finger is positioned on the material recess.

Alternatively or in addition to this, it is favourable if the receptacle-side control means have at least one control element extending away from an outer side of the cover. This enables the virtual or mechanical device-side control element to be acted upon by actuation of the control element on the outside, which in turn enables good haptic perception of the receptacle-side control means and enables them to be conveniently actuated.

Advantageously, the at least one receptacle-side control element forms a control lever or joystick. This enables particularly convenient and precise control of the mobile radio device, for example even when wearing work gloves. Alternatively or in addition to this, it is advantageous if the at least one receptacle-side control element forms a regulator, by which specially differentiated control signals can be generated, for example with regard to a speed or an applied force of a controlled device. Alternatively or addition to this, it is favourable if the receptacle-side control element forms a rotary switch, which enables a control element to be provided on the mobile radio device that can be adjusted, in particular like a rotary potentiometer.

Alternatively or addition to this, it is also advantageous if the at least one receptacle-side control element is formed by a button, in particular a collapsible bubble-shaped button. This can be formed in such a way that a voltage change on the device-side control means can only be generated via said button in a pressed or collapsed position, said voltage change being suitable for generating a control signal. This enables, for example, capacitive touchscreens to be acted upon in a simple and comfortable way.

In a further advantageous embodiment, a separate hand-held actuator is provided for actuating the receptacle-side control element, which enables actuation of the control elements to be simplified and adapted to the prevailing working conditions. In this case it is advantageous if the hand-held actuator is formed by a separate pen. By means of a pen the mobile radio device can be acted upon very precisely even when work gloves are used.

Furthermore, it is advantageous if the receptacle-side control element has an elastic impact surface for contacting the device-side control means. The advantage of this is that the receptacle-side control element undergoes a different deformation depending on the applied force. In this way, different control signals can be generated depending on the applied force. In this case it is advantageous if the elastic impact surface is spherical. As a result, the impact surface forms a contact surface of different size depending on the applied force, which contact surface in turn contacts, for example, a different number of detection fields defined by the device-side control means.

Furthermore, it is advantageous if the receptacle-side control element is electrically conductive at least in certain regions. For example, a conductive body is in this case provided in a contact region of the receptacle-side control means for reinforcing contact with the device-side control means. As a result, the voltage changes required for generating control signals on capacitive touchscreens can be securely generated when the receptacle-side control element is actuated. In this case it is favourable if the receptacle-side control devices are formed at least in certain regions from a conductive material, which makes it particularly easy to produce the electrical conductivity in particular regions. In addition or alternatively, it is advantageous if the control element on the receptacle side has conductive material inclusions. As a result, sufficient electrical conductivity can be produced, even in a low-conductivity material, such as an elastic plastic, which is preferred for the receptacle-side control means. In this case it is favourable if the material inclusions have electrically conductive fibres, whereby the voltage changes can be generated in exactly predetermined contact regions when the receptacle-side control means are actuated.

Furthermore, it is favourable if haptic feedback means are provided on the at least one control element. By means of the haptic feedback means, a feedback can be generated, for example depending on an impact duration, an impact path or an impact force, which makes it possible to control the mobile radio device held in the protective/control receptacle more conveniently. This enables, for example, particularly exact pressure-dependent generation of control signals. In an advantageous embodiment, haptic feedback can be generated by means of the feedback means, which haptic feedback can be changed depending on an impact path. Depending on the impact path, a larger or smaller haptic feedback is for instance generated depending on the position of a regulator or joystick, which enables particularly exact path-dependent generation of control signals. In a further favourable embodiment, haptic feedback can be generated by means of the feedback means, which haptic feedback can be changed depending on an impact duration. As a result, the user receives a greater or smaller haptic feedback depending on the impact duration, for example when actuating a push button or joystick, which enables particularly exact time-dependent generation of control signals.

In a particularly advantageous embodiment, all corners of the mobile radio device can be held in the corner protector. The advantage of this is that the mobile radio device is protected on all sides and can therefore be protected from major damage when falling from a certain height, regardless of its orientation in the event of an impact. For this purpose, the corner protector has a continuous peripheral form, so that the mobile radio device can also be protected between the corners.

Advantageously, the cover forms a device receptacle that can be closed on all sides, and which also has sealing means to prevent the ingress of liquids, gases or solids. As a result, the mobile radio device can be reliably sealed off from the outside by means of the cover and effectively protected against the ingress of liquids and particles into the interior of the cover.

It is also favourable if the cover is transparent at least in certain regions. The advantage of this is that the mechanical or virtual control means on the device side or other displays of the mobile radio device are clearly visible and can be conveniently operated.

Advantageously, the corner protector is elastic at least in certain regions, so that a relatively high external impact energy can be absorbed by the protective/control receptacle, for example when the mobile radio device is dropped.

Advantageously, the cover is made of a plastic or mixture of plastics, and has at least partially reinforced regions, whereby the protective/control receptacle can be produced cost-effectively even with a complex form and is particularly stable with respect to external impacts in the regions that are most likely to be subjected to stress.

Advantageously, the cover has a widened grip section at least on one edge in order to ensure a secure grip of the protective/control receptacle even with gloves, for example. The grip section can in this case be formed in one piece with the cover, or separately from the latter and subsequently attached thereto. The grip section can be fixed to the cover permanently or detachably. It is in any case favourable if the widened grip section has a contour that is ergonomically adapted to the shape of a palm of the hand, which makes it possible for the cover to be gripped particularly comfortably with one hand. For this purpose, the contour of the grip section can be convex in some regions and/or concave in some regions. In addition, the cover advantageously has one of the grip sections on each of two opposite edges. This allows the user to place each of his hands on one edge of the cover to hold the remote control arrangement securely while simultaneously operating it with his thumbs. Alternatively or in addition to this, it is also possible to control the remote control arrangement via an inclination sensor system of the mobile radio device.

Advantageously, the mobile radio device has application software by means of which the device-side control devices can be matched to the receptacle-side control devices. This ensures that the mobile radio device is particularly well matched to the protective/control receptacle. In addition, the mobile radio device can be matched to different devices, where, for example, different or individual settings are selectably stored on the mobile radio device. In addition, it is advantageous if a feedback signal in the form of vibrations, tones, tone sequences or light effects can be generated on the mobile radio device by means of the application software when the control means on the device side are actuated. This makes it possible to generate feedback signals with regard to an actuation of the control means carried out by the user, even where the protective/control receptacle has a simple and cost-effective structure.

Furthermore, it is favourable if a separate radio unit in the form of a radio transmitter and/or receiver is held in the protective/control receptacle for amplifying control signals. In this case, the separate radio unit also has an interface for connection to the mobile radio device. This means that the control signals can also be transmitted via radio using a commercially available mobile radio device held in the protective/control receptacle, which enables faster and more stable signal transmission from the mobile radio device to a device that is to be controlled.

In a particularly advantageous embodiment of the remote control arrangement, a separate receiving and conversion module is further provided which can be coupled to the mobile radio device to receive device-side control signals in a first format and by means of which the control signals can be converted into a second format and transmitted. The device-side control signals in the first format can be, for example, Bluetooth, infrared or WLAN signals. These are converted by the receiving and conversion module into control signals of the second format, which are, for example, radio signals. As a result, the receiving and conversion module can, for example, be positioned relatively close to or within sight of the mobile radio device held in the protective/ control receptacle in order to ensure reliable reception of the device-side control signals in the first format. The control signals are then converted and transmitted in the second format, allowing a device to be securely controlled, even if it is further away or positioned behind obstacles. Advantageously, the receiving and conversion module is held as a mobile module in a portable housing, which allows that module to be conveniently carried and placed in a suitable position.

An exemplary embodiment of the invention is shown in the Figures, in which.

Figure 1:
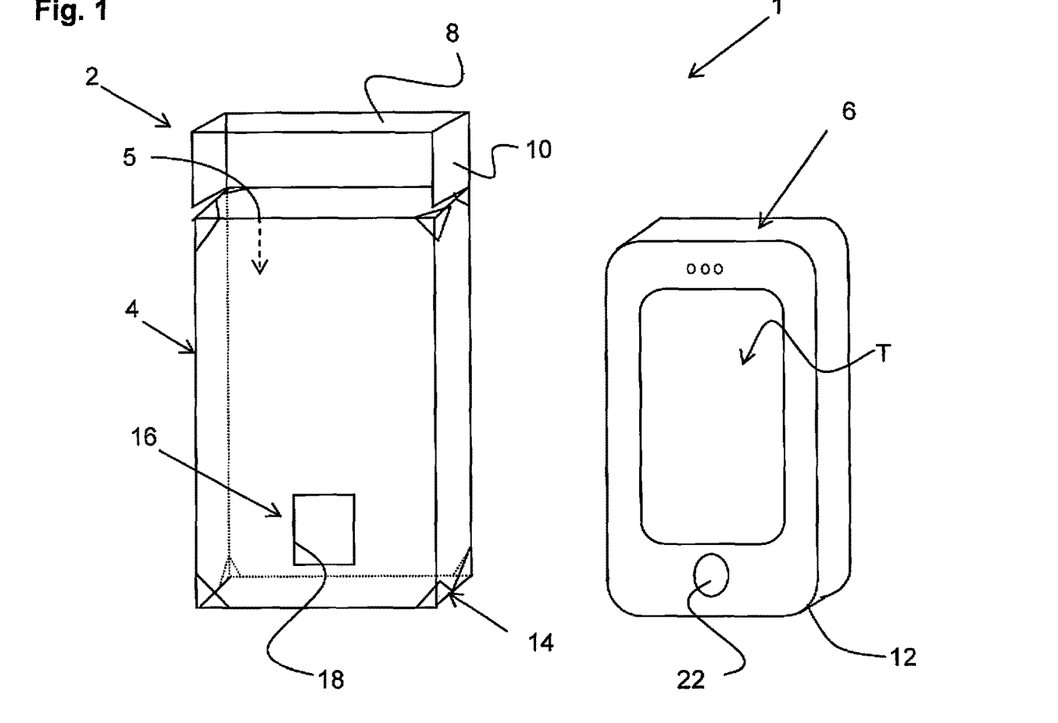
FIG. 1 is a perspective view of a remote control arrangement with a protective/control receptacle and a mobile radio device that can be held therein.

FIG. 1 shows a remote control arrangement 1, in particular for controlling lifting devices on construction sites and/or industrial plants by means of a commercially available mobile radio device 6, such as for example a smartphone or a tablet computer. For this purpose, the remote control arrangement 1 has a protective/control receptacle 2, which forms a cover 4, in which the mobile radio device 6 can be held. The mobile radio device 6 has in this case a capacitive touchscreen T and by way of example at least one button B.

The protective/control receptacle 2 is formed in such a way that it effectively protects the mobile radio device 6 held therein against external impacts by moisture, gases or solids or by external forces and at the same time enables the mobile radio device to be used as a remote control by actuation from outside of the cover 4. This means that the mobile radio device, which, for example, is only configured for normal use as a mobile telephone, can also be used as a remote control on, for example, construction sites and in industrial plants without being damaged by the relatively high external stresses that frequently occur in these situations.

The protective/control receptacle 2 has five sides that define a device receptacle 5 that is adapted to the dimensions and shape of the mobile radio device 6. In addition, a top cover 8 is provided, by means of which the device receptacle 5 can be closed and opened.

The top cover 8 has, for example, three side parts 10, which are moved into the device receptacle 5 when closing, bringing about an exact and tight closed position of the top cover 8 with respect to the cover 4. This means that the protective/control receptacle 2 can be closed tightly on all sides. Alternatively, the device receptacle 5 can be closed tightly, for example with a hook-and-loop fastener, a button closure, a labyrinth closure or any other known and suitable sealing means, in order to prevent the ingress of liquids, gases or solids into the device receptacle 5.

The protective/control receptacle 2 can, for example, be formed from a fluid-tight and elastic plastic or a plastic mixture, such as for example polyethylene or polypropylene. In addition, the protective/control receptacle 2 can have reinforced regions, in particular in the region of the cover 4, for stabilisation and increasing tear resistance, in which, for example, tensile fibres or stiffening elements are incorporated into the remaining material.

Figure 2:
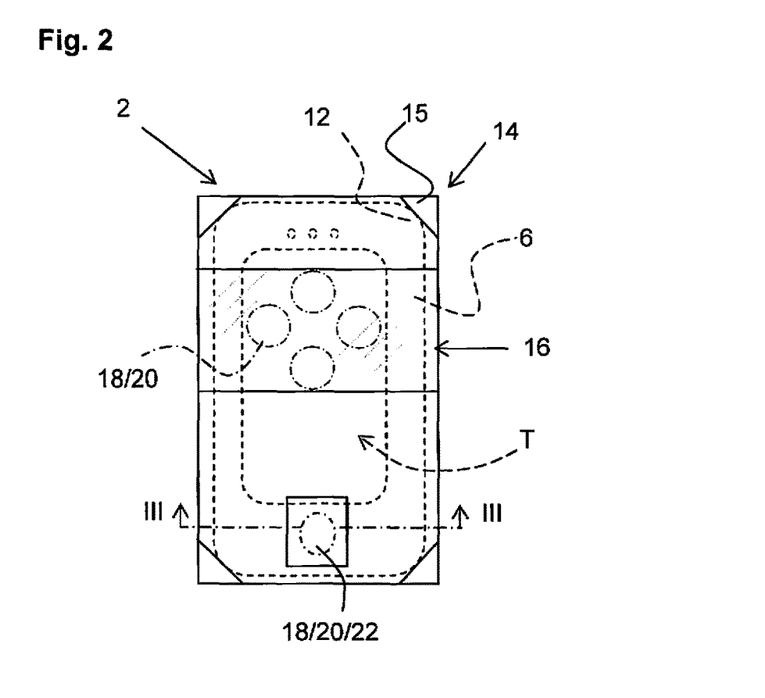
FIG. 2 shows a view of the front of the protective/control receptacle according to FIG. 1 with a mobile radio device held therein.

In any case, the protective/control receptacle 2 forms a corner protector 14, in which all corners 12 of the mobile radio device 6 can be held, as shown in FIG. 2 in particular. The corner protector 14 is either formed, as shown, by separate protection regions 15 on the individual corners 12 or alternatively in a closed peripheral manner (not shown).

In any case, the corner protector 14 is formed at least in certain regions of an elastic material, so that impact energy acting upon the protective/control receptacle 2 can be at least partially absorbed by deformation of the corner protector 14 if said protective/control receptacle is dropped or is subject to pressure or impact.

The protective/control receptacle 2 can also have at least one transparent region 16, in particular in the region of the cover 4 (see FIG. 2). The transparent region 16 is, for example, arranged over device-side control means 18 of the mobile radio device 6, said control means comprising at least one virtual control panel 20 generated on the touchscreen T and/or a mechanical control element 22, for example in the form of a key or a button. These device-side control means 18, which are actuated via the protective/control receptacle 2, can thus be easily seen by the user.

For secure and exact actuation of the device-side control means 18, receptacle-side control means 24 are provided on the protective/control receptacle 2. In the embodiment of the protective/control receptacle 2 according to FIG. 3, these comprise, by way of example, a partial material recess 26 in the form of a cavity in the cover 4. This material recess 26 is arranged above the device-side virtual control panel 20 or above the mechanical control element 22 and can be felt and acted upon by the user's finger.

Figure 3:
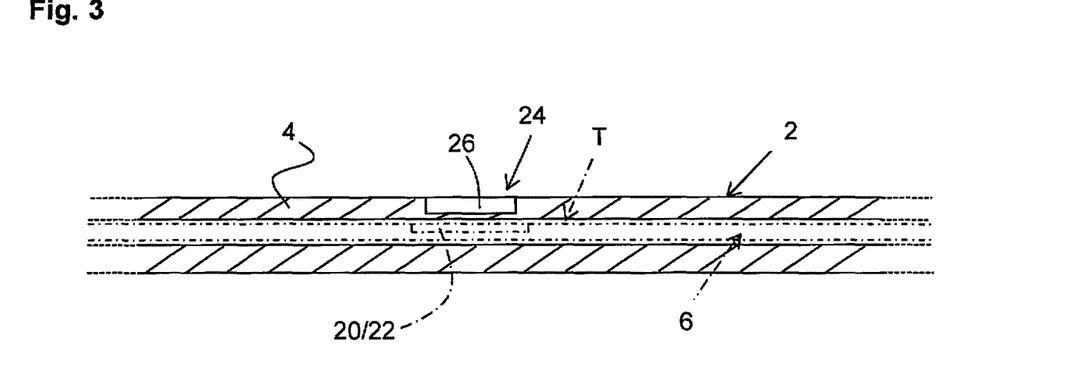
FIG. 3 shows a sectional view of the protective/control receptacle in the plane III-III of FIG. 2

The material recess 26 is formed in such a way that a sufficient closed material layer of the cover 4 remains to protect the mobile radio device 6 from soiling or damage. At the same time, the thickness of the remaining material layer is chosen such that a capacitive change detectable by the touchscreen T can be generated by the material recess 26 being acted upon by a finger of the user, so generating a control signal.

Figure 4:
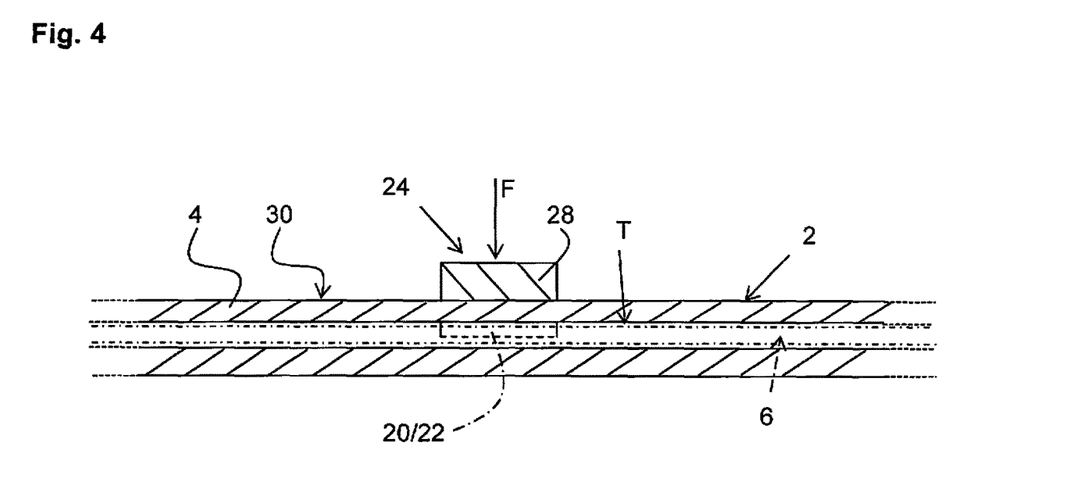
FIG. 4 shows a sectional view of the protective/control receptacle with control means on the receptacle side in an alternative embodiment.

In the embodiment of the protective/control receptacle 2 according to FIG. 4, the receptacle-side control means 24 are formed by a control element 28 which extends away from an outer side 30 of the cover 4. The receptacle-side control element 28 is in this case also arranged above the device-side virtual control panel 20 or the mechanical control element 22.

The receptacle-side control element 28 can therefore be acted upon by a pressure F in such a way that it actuates the device-side virtual control panel 20 or the mechanical control element 22 of the mobile radio device 6 and generates a control signal of the mobile radio device 6. At the same time, the receptacle-side control element 28 is deformed, which is perceived by the user as a haptic feedback. In this case it is advantageous if the receptacle-side control element 28 is electrically conductive in order to be able to generate a reliably detectable voltage change on the capacitive touchscreen T, for example.

Figure 5:
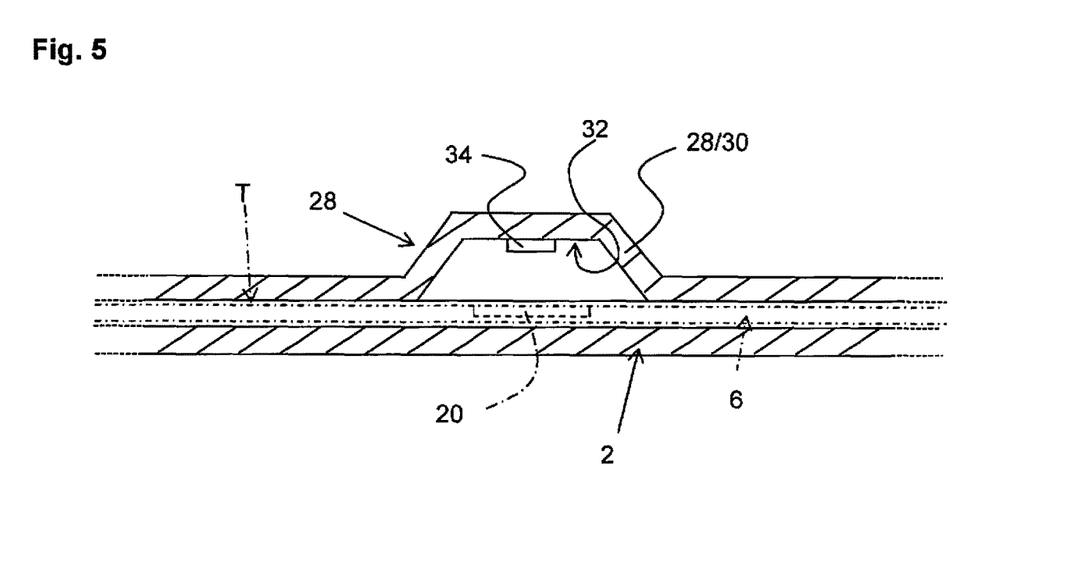
FIG. 5 shows a sectional view of the protective/control receptacle with control means on the receptacle side in a further alternative embodiment.

As shown in FIG. 5, the receptacle-side control element 28 can also be formed by a substantially bubble-shaped collapsible button 30. This can be brought by the application of pressure into a contact position, in which it lies with an inner side 32 against the virtual control panel 20 of the touchscreen T, in order to generate a detectable capacitive change. In order to ensure a sufficient voltage change on the touchscreen T as a result of the finger pressure exerted via the button 30, an electrically conductive contact body 34, such as a metal button, can be provided on the inside 32 of the button 30, which ensures reliable voltage transmission in the contact position.

Figure 6:
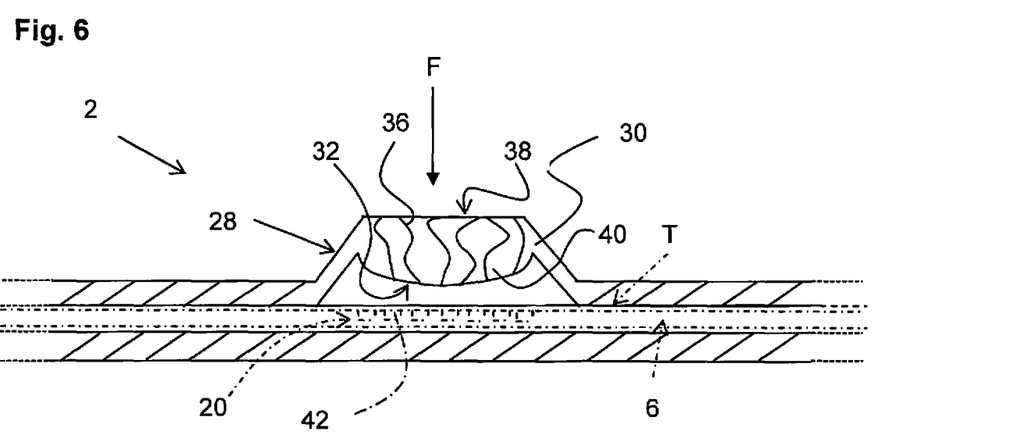
FIG. 6 shows a sectional view of the protective/control receptacle with control means on the receptacle side in a further alternative embodiment.

FIG. 6 shows a further alternative embodiment of the collapsible button 30, which has electrically conductive material inclusions 36 in the form of electrically conductive fibres which extend from an outer side 38 of the receptacle-side control element 24 to the inner side 32. This is formed by an elastic impact surface 40, with a spherical shape.

The impact surface 40 is arranged above the virtual control panel 20, which in this case has a plurality of detection fields 42. By acting upon the button 30 with a compressive force F, it can be brought into the contact position, in which the inner side 32 is applied to the touchscreen T. The number of detection fields 42 thereby contacted depends on the magnitude of the applied compressive force F and the resulting elastic deformation of the impact surface 40.

Figure 7:
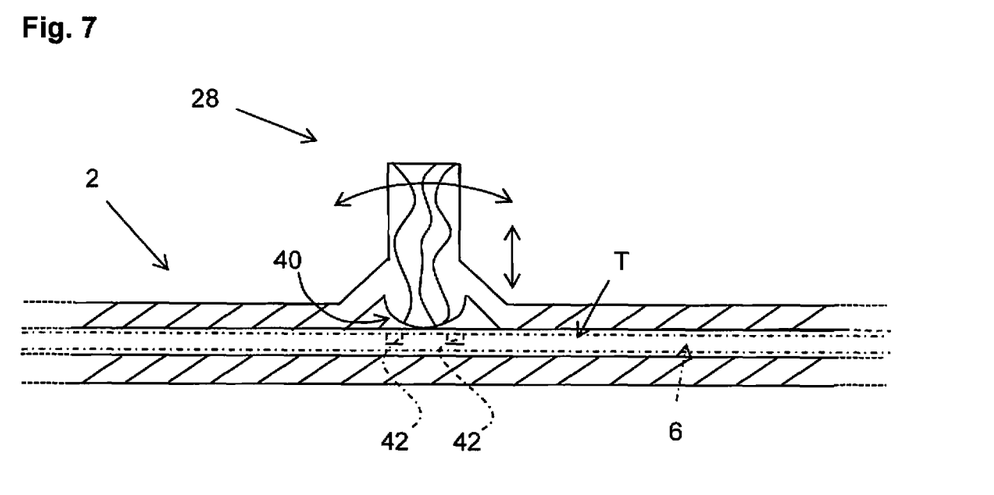
FIG. 7 shows a sectional view of the protective/control receptacle with control means on the receptacle side in a further alternative embodiment.

FIG. 7 shows a further alternative embodiment of the receptacle-side control element 28 as a control lever or joystick. The receptacle-side control element 28 can, for example, be swivelled in two or more directions and acted upon perpendicularly. Depending on the impact direction, the spherical impact surface 40 is applied to particular detection fields 42 of the touchscreen T, which in turn generates particular control signals.

Figure 8:
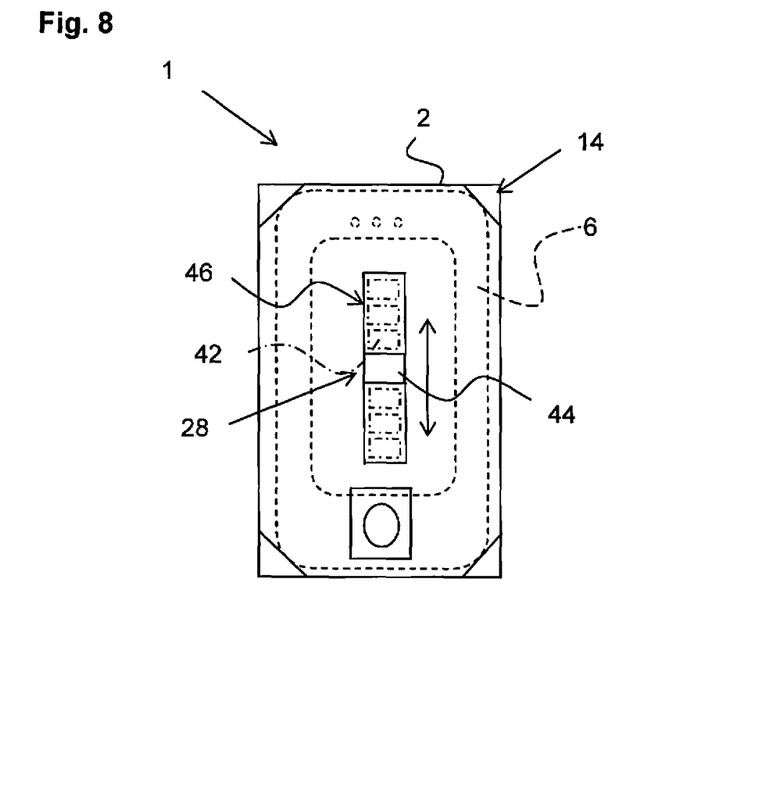
FIG. 8 shows a view of the protective/control receptacle with control means on the receptacle side in a further alternative embodiment.

The receptacle-side control element 28 can also be formed as a regulator 44, as shown in the embodiment according to FIG. 8. The regulator 44 is in this case integrated into the protective/control receptacle 2 and can be moved along a guide 46. Depending on the position of the regulator 44 along the guide 46, different detection fields 42 are contacted, which in turn generate different control signals. Furthermore, the receptacle-side control element 28 can alternatively be formed as a rotary button (not shown).

Figure 9:
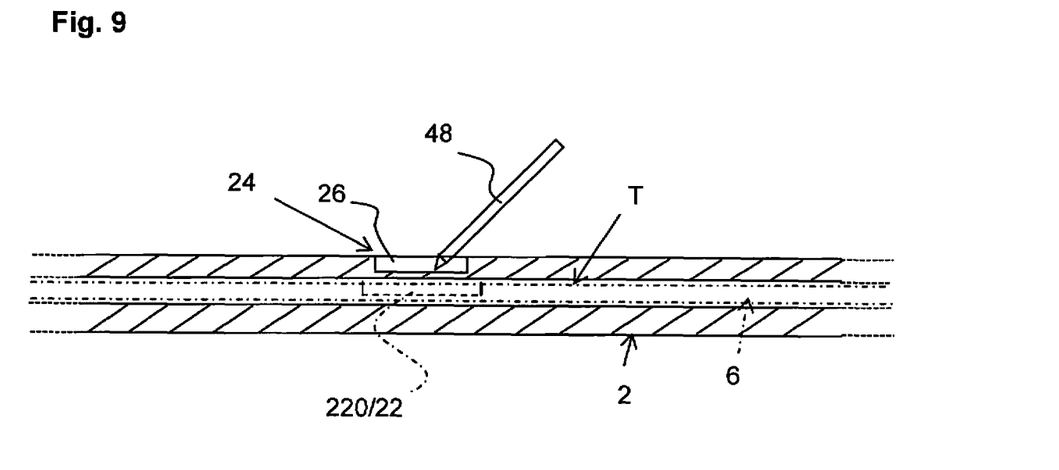
FIG. 9 shows a sectional view of the protective/control receptacle with a separate hand-held actuator.

In addition, it is also possible for the protective/control receptacle 2 with a mobile radio device 6 fitted, for example in accordance with FIG. 3, to be controlled by a separate hand-held actuator 48, as shown in FIG. 9. The separate hand-held actuator 48 is formed, by way of example, by a stylus or a pen with a tip. By this means, a point of the touchscreen T to be acted upon within the material recess 26 can be acted upon exactly. As an alternative to the illustration according to FIG. 9, it is also possible to configure the separate hand-held actuator 46 and the material recess 26 in such a way that they can be fastened or docked to one another.

When the device-side control means 18 are acted upon via the receptacle-side control means 24 or the separate hand-held actuator 46, the generation of feedback, in particular haptic feedback, can be provided in all embodiments.

Figure 10:
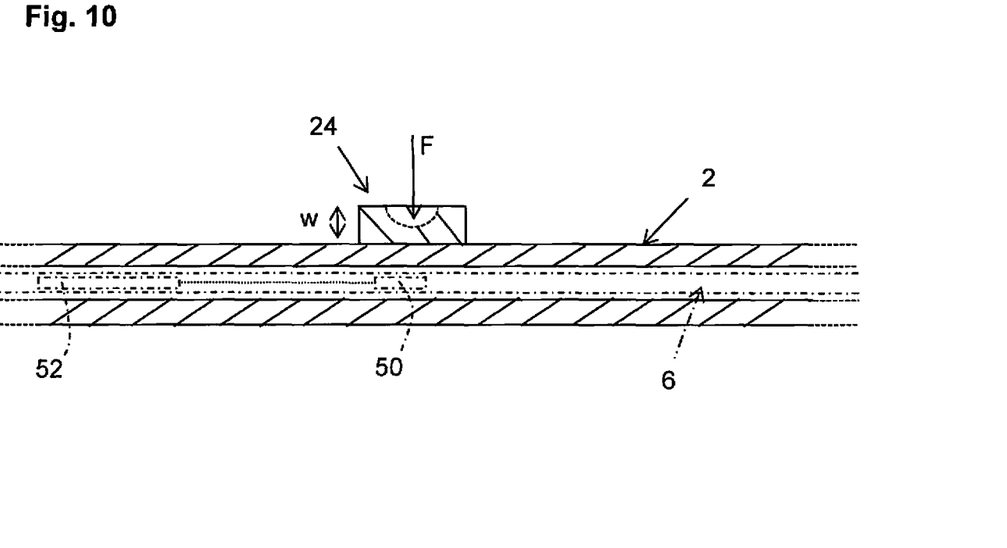
FIG. 10 shows a sectional view of the protective/control receptacle with feedback means on the device side.

As an alternative to the purely mechanical haptic feedback described above, a device-side feedback generated by the mobile radio device 6 can also be provided. The impact of the receptacle-side control means 24 can be detected and evaluated, depending on the impact intensity, by a device-side sensor system 50 of the mobile radio device 6, as shown in FIG. 10. Depending on the impact intensity, a device-side electronic system 52 can generate a predetermined feedback from the mobile radio device 6. The feedback can, for example, be generated in dependence on an impact path w, the impact compressive force F or an impact time. Vibrations, for example, can be generated as haptically perceivable feedback from the mobile radio device 6. Alternatively, acoustic or optical signals can also be generated, for example in the form of tones, tone sequences or light effects, as path- or pressure-dependent feedback.

Figure 11:
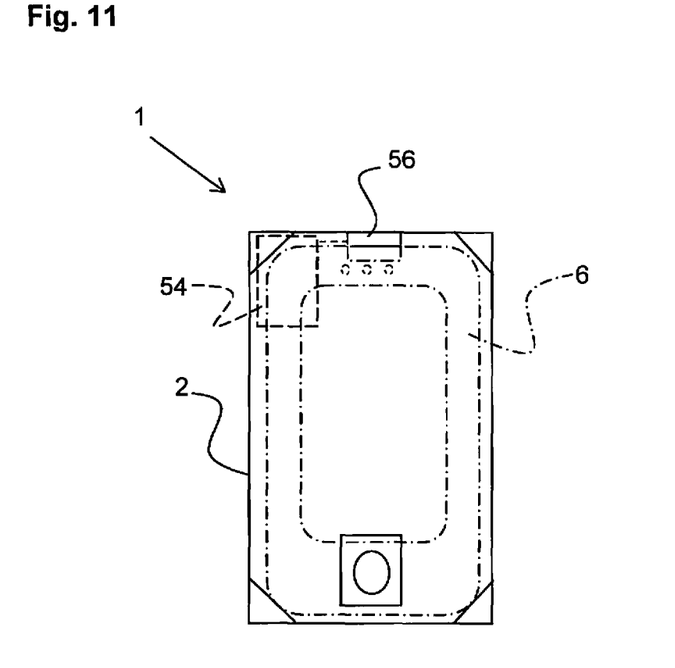
FIG. 11 shows a view of the protective/control receptacle with a radio unit.

FIG. 11 shows a further embodiment of the remote control arrangement 1, in which the protective/control receptacle 2 additionally has an integrated separate transmitter unit 54, for example in the form of a transceiver with a radio transmitter and receiver. The transmitter unit 54 can be provided on any part of the protective/control receptacle 2 and serves, for example, to enable faster and more stable transmission of the control signals in a different format than that provided in the mobile radio device 6. An interface 56 for connecting the radio unit 54 to the mobile radio device 6 is provided for this purpose in the protective/control receptacle 2. This can be done, for example, via a standard connection, such as in particular a USB port, or alternatively also wirelessly, such as for example a Bluetooth connection.

Figure 12:
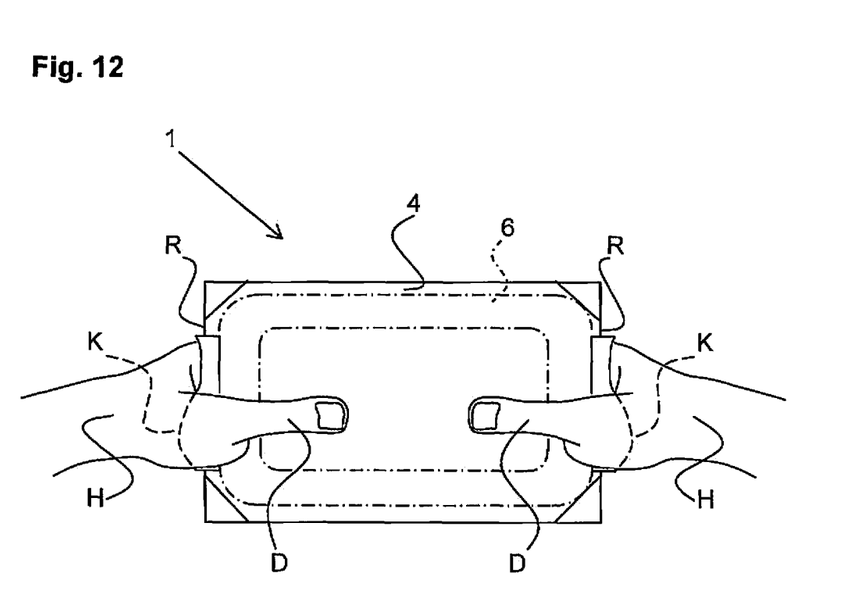
FIG. 12 shows a view of the protective/control receptacle with additional grip sections and FIG. 13 shows a view of the remote control arrangement with a receiving and conversion module.

FIG. 12 shows a further embodiment of the remote control arrangement 1, in which the protective/control receptacle 2 has in each case a grip section 58 on two opposite edges R of the cover 4. The grip sections 58 have in this case a larger width than the cover 4 and form a contoured shape K, which is convex in certain regions to achieve an ergonomically favourable shape. This allows the user to comfortably place his hands H on the edges R of the protective/control receptacle 2 to control the remote control arrangement 1 with his thumbs D. Alternatively, the grip sections 58 can also be used only to hold the remote control arrangement 1 securely and, for example, to control it via an inclination sensor system of the mobile radio device 6.

Figure 13:
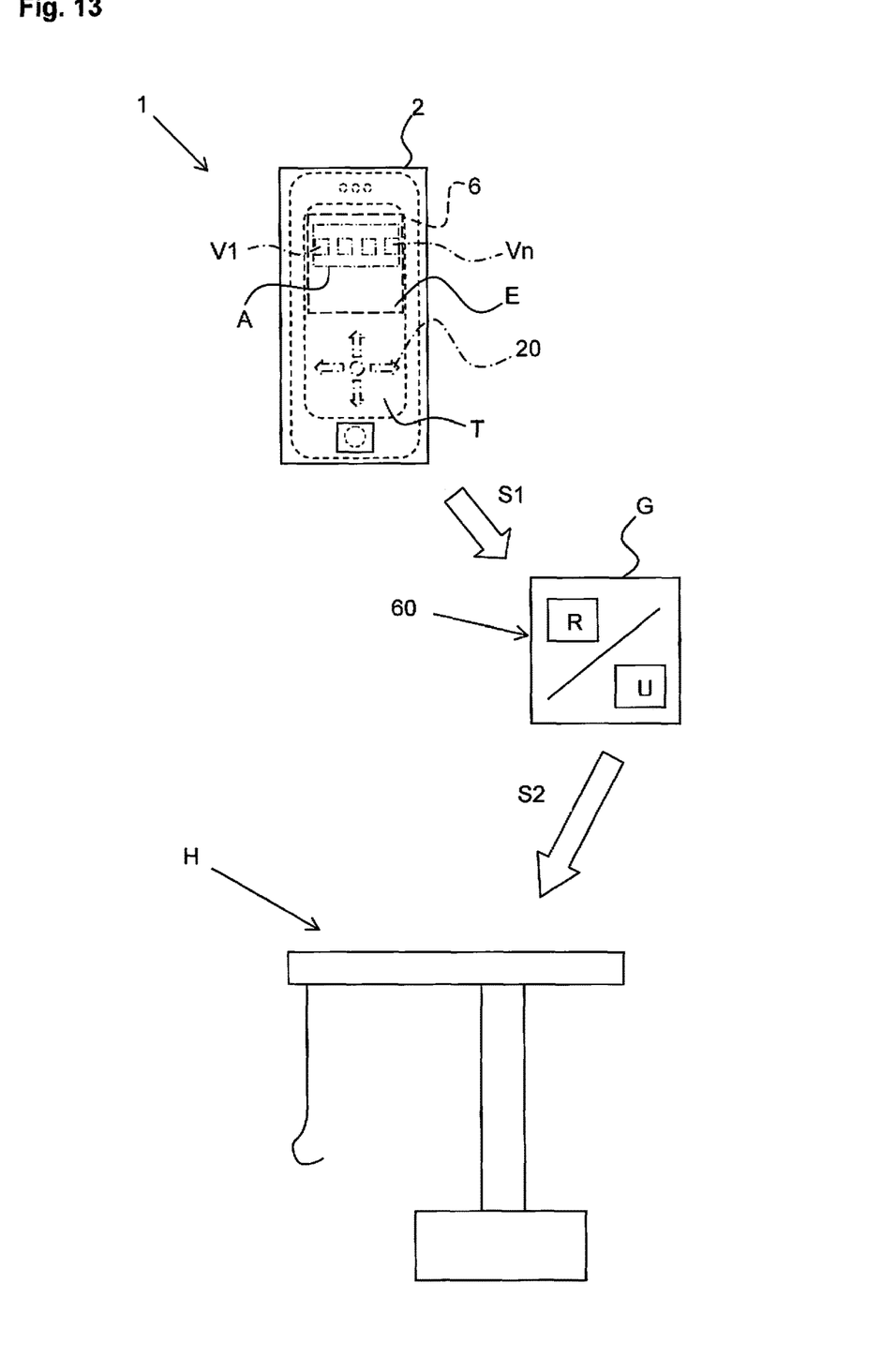

FIG. 13 shows the remote control arrangement 1 with an exemplary embodiment of the protective/control receptacle 2 or the inserted mobile radio device 6. As indicated by broken lines, application software A is stored in an electronic system E of the mobile radio device 6, which permits the use of the remote control arrangement 1, in particular for controlling lifting devices H. The application software A provides a plurality of different pre-settings V1 to Vn, which can be selected individually in order to exactly match the mobile radio device 6, or its device-side control means 18, to the respective lifting device. In particular, the virtual control panels 20 displayed on the touchscreen can, for example, be generated in a form that is particularly suitable for the respective lifting device H.

In addition, the remote control arrangement 1 can have an additional receiving and conversion module 60 as shown. This has a receiving device R, by means of which device-side control signals S1 are received and which are transmitted by the mobile radio device 6 in a first format. By means of a conversion device U, these device-side control signals S1 can be converted into a second format and transmitted as module-side control signals S2 in order to control the lifting device H. The second format is in this case usually selected in such a way that it enables a longer range or more direct and faster control of the lifting device H.

In order to be able to conveniently transport the receiving and conversion module 60 and to place it in a protected manner at a location that is as suitable as possible, the receiving device R and the conversion device U are accommodated in a common housing G and thus form a unitary mobile module.

The invention claimed is:

1. A remote control arrangement, comprising:
   a mobile radio device for use as a remote control, the remote control having a touch screen;
   a closed peripheral cover having a corner protector for holding corners of the mobile radio device;
   a collapsible button formed in the cover, the collapsible button extending above an upper surface of the cover and positioned over the touch screen, the collapsible button having an upper surface and a lower surface; and
   a convex surface extending from the lower surface of the collapsible button, the convex surface facing the touch screen.

2. The remote control arrangement according to claim 1, wherein the collapsible button comprises at least one control element extending away from an outer side of the cover.

3. The remote control arrangement according to claim 1, wherein the collapsible button has an elastic impact surface.

4. The remote control arrangement according to claim 1, wherein the collapsible button has a plurality of electrically conductive inclusions extending from the upper surface to the lower surface of the collapsible button.

5. The remote control arrangement according to claim 1, wherein the collapsible button has a haptic feedback mechanism.

6. The remote control arrangement according to claim 1, wherein all corners of the mobile radio device can be held in the corner protector and wherein said corner protector has a continuous peripheral form.

7. The remote control arrangement according to claim 1, wherein the cover forms a device receptacle that can be closed on all sides and a seal is provided to prevent the ingress of liquids, gases or solids.

8. The remote control arrangement according to claim 1, wherein the cover is transparent.

9. The remote control arrangement according to claim 1, wherein the corner protector is elastic in order to have a shock-absorbing effect.

10. The remote control arrangement according to claim 1, wherein the cover is produced from a plastic or plastic mixture and is provided at least partially with reinforced regions.

11. The remote control arrangement according to claim 1, wherein the cover has a widened grip section, at least on one edge, the widened grip section being adapted to the shape of a palm of the hand.

12. The remote control arrangement according to claim 1, wherein the mobile radio device has application software by which the device-side control can be matched to the receptacle-side control.

13. The remote control arrangement according to claim 1, wherein the collapsible button comprises at least one control element extending away from an outer side of the cover.

14. The remote control arrangement according to claim 1, further comprising a guide on the cover,
   wherein the collapsible button is movable along the guide.

15. The remote control arrangement according to claim 1, further comprising an extension extending upwardly from the upper surface of the collapsible button,
   wherein the extension is pivotable about an axis perpendicular to the cover.

16. A remote control arrangement, comprising:
   a mobile radio device having a touch screen generating at least one virtual control for use as a remote control;
   a stand-alone protective receptacle receiving said mobile radio device and forming a closed peripheral cover having at least one corner protector for holding a corner of the mobile radio device; and
   the stand-alone protective receptacle having at least one integrated physical control element extending away from the cover and being positioned above the at least one virtual control so that the virtual control can be activated by the physical control element,
   wherein the at least one integrated physical control element is haptically perceivable.

17. The remote control arrangement according to claim 16, wherein the at least one integrated physical control element comprises a collapsible button having an inner surface and an outer surface and a lever extending upwardly from the outer surface of the collapsible button.

* * * * *